United States Patent
Duckeck

(10) Patent No.: US 6,947,834 B2
(45) Date of Patent: Sep. 20, 2005

(54) METHOD FOR INPUTTING A DESTINATION INTO A NAVIGATION DEVICE

(75) Inventor: Ralf Duckeck, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/239,326

(22) PCT Filed: Mar. 15, 2001

(86) PCT No.: PCT/DE01/01021

§ 371 (c)(1),
(2), (4) Date: Dec. 23, 2002

(87) PCT Pub. No.: WO01/69178

PCT Pub. Date: Sep. 20, 2001

(65) Prior Publication Data

US 2004/0010365 A1 Jan. 15, 2004

(30) Foreign Application Priority Data

Mar. 15, 2000 (DE) .......................... 100 12 441

(51) Int. Cl.$^7$ ............................. G01C 21/26
(52) U.S. Cl. .................... 701/201; 701/203; 701/210; 340/995.23
(58) Field of Search ................. 701/201, 202, 701/203, 209, 210, 211; 340/995.23, 995.25, 995.28

(56) References Cited

U.S. PATENT DOCUMENTS

| | | | | |
|---|---|---|---|---|
| 5,471,392 A | * | 11/1995 | Yamashita | 701/200 |
| 5,568,390 A | * | 10/1996 | Hirota et al. | 701/201 |
| 5,825,306 A | * | 10/1998 | Hiyokawa et al. | 340/988 |
| 5,938,720 A | * | 8/1999 | Tamai | 701/209 |
| 5,964,821 A | * | 10/1999 | Brunts et al. | 701/201 |
| 6,088,649 A | * | 7/2000 | Kadaba et al. | 701/201 |
| 6,122,592 A | * | 9/2000 | Arakawa et al. | 701/201 |
| 6,144,920 A | * | 11/2000 | Mikame | 701/212 |
| 6,278,940 B1 | * | 8/2001 | Endo | 701/209 |
| 6,429,813 B2 | * | 8/2002 | Feigen | 342/357.13 |

FOREIGN PATENT DOCUMENTS

| | | |
|---|---|---|
| DE | 196 14940 | 10/1997 |
| DE | 19742054 | * 4/1999 |
| EP | 0 747 835 | 12/1996 |
| EP | 0 789 224 | 8/1997 |
| EP | 0 827 124 | 3/1998 |
| EP | 0633452 | * 1/2000 |
| EP | 0 978 707 | 2/2000 |
| JP | 09-096538 | 4/1997 |

* cited by examiner

Primary Examiner—Tan Q. Nguyen
(74) Attorney, Agent, or Firm—Kenyon & Kenyon

(57) ABSTRACT

A method for entering destinations into a navigation device is described, characters of a destination name being input and a list of destination names which begin with the character(s) input being generated as a function of the character(s) input, in which the list of destination names is generated as a function of the distance of the destinations assigned to the destination names, from a current location. The method eases and accelerates navigation destination input, in particular in those cases in which multiple destination names and destinations exist which fit one or more letters of the destination name input.

5 Claims, 2 Drawing Sheets

METHOD FOR INPUTTING A DESTINATION INTO A NAVIGATION DEVICE

FIELD OF THE INVENTION

The present invention is directed to a method for entering destinations into a navigation device, characters of a destination name being input and a list of destination names being generated as a function of the destination name(s) input.

BACKGROUND INFORMATION

A method of destination input on navigation devices, for example from Blaupunkt-Werke GmbH, Hildesheim, is known in which a destination name assigned to a navigation destination is input letter-by-letter by scrolling through an alphabet using a scroll button provided for this purpose and confirming a selected letter using a confirmation button. For each letter input or each sequence of letters input, a list of destination names is generated which contains those destination names beginning with the letter(s) input. A destination name is selectable from this list. Alternatively, further letters of the destination name may be input to shorten the list.

This known form of destination input is complicated merely because it requires scrolling through the German alphabet, which is quite extensive, having 29 letters including umlauts.

The method described was therefore modified in that, after input of one or more letters of the destination name, only those letters were offered for further letter input which resulted in connection with the letter(s) already input in destination names contained in a location database. This method is known as "thinned speller."

SUMMARY OF THE INVENTION

The method according to the present invention in which a list of destination names is generated as a function of the distance of the destinations assigned to the destination names, from a current location, has the advantage over the related art that destination input is made even easier.

According to a first embodiment, this object is achieved in that the list of destination names only contains those destination names whose assigned destination locations lie inside a selected or selectable radius around the current location. In this way, the list of destination names is, as a rule, significantly shortened. This allows the user faster orienting within the list of destination names and therefore faster finding of the desired destination name.

According to a second embodiment, this object is achieved in that the list is sorted as a function of the distance of the destinations assigned to the destination names, from the current location. The scope of the list of destination names is not reduced in this way; however, orientation of the user within the list of destination names is made easier by the additional distance criterion.

Destination input is made even easier by combining the first embodiment and the second embodiment, specifically if the list of destination names only contains those destination names whose assigned destination locations lie inside a selected or selectable radius around the current location and, in addition, this list is sorted according to the distance of the destinations assigned to the destination names, from the current location.

Furthermore, in order to avoid confusing the user, it is also advantageous if, before sorting of the destination names assigned to the destination locations as a function of distance, the destination names are sorted alphabetically as a first priority and sorted according to the distance from the current location only as a lower-order criterion.

DETAILED DESCRIPTION

Figure 1:
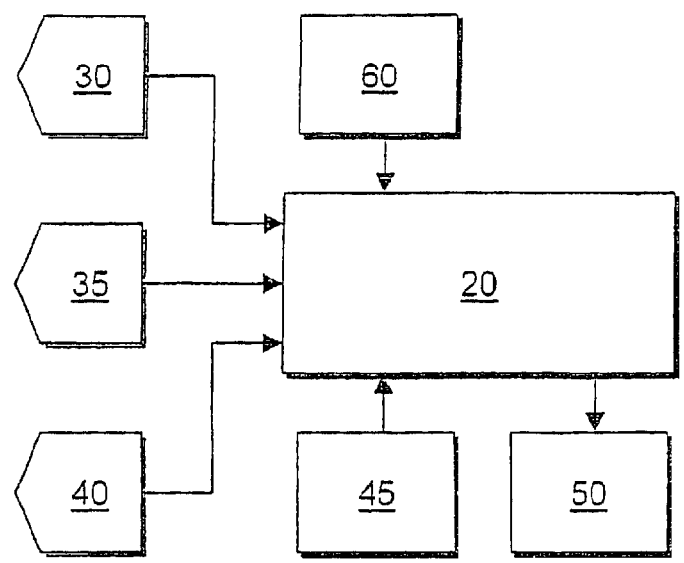
FIG. 1 shows a block diagram of a navigation device for carrying out the method according to the present invention.

FIG. 1 shows a block diagram of a navigation device 10 using the example of a vehicle navigation system for carrying out the method according to the present invention.

First of all, means 30, 35, 40, which output information about the location, the motion direction, and the motion state of the vehicle, are connected to a device controller 20 of navigation device 10, which also includes, among other things, the actual navigation computer.

In the present exemplary embodiment, these means include a yaw rate sensor 30, using which, in relation to the cardinal points, the orientation of the vehicle in which the navigation device is installed is detected through integration via the changes detected in the yaw rate. These means also include an odometer 35, which, for example, detects pulses output by wheel sensors of an antilock braking system for vehicle brakes and determines a distance traveled from the pulse count determined and a known wheel circumference. Finally, these elements include a GPS (global positioning system) receiver 40 for receiving and analyzing radio signals emitted by GPS satellites, with reference to which the position of the vehicle may be established.

Furthermore, a memory 60, in which information of a map or street map is stored in digital form, is connected to controller 20. In the present exemplary embodiment, memory 60 is implemented in the form of a CD-ROM drive having an inserted CD-ROM as a data carrier for the map information. However, memory 60 may also be implemented in the form of a RAM or ROM semiconductor memory.

The information contained in memory 60 includes, in particular, locations and cities of a region or a country, their geographical position, which is preferably indicated in degrees of geographical longitude and latitude, and their assigned place names. Furthermore, in the case of the present vehicle navigation device, the information includes traffic connections between the locations and cities which are usable by vehicles, i.e., freeways, state and federal highways, and local roads in particular, as well as streets within cities and other streets.

In the case of a navigation device provided, for example, for bicycles, other conveyances not bound to public streets, or pedestrians, the information contained in memory 60 preferably includes supplementary information about bicycle paths, footpaths, and similar traffic paths.

Furthermore, the information may also include, in addition to locations, with geographical position and place names, destinations within locations, for example sports facilities, such as tennis courts, swimming pools, and soccer fields, cultural institutions, such as opera houses, theaters, and museums, or even instructions to alternative traffic infrastructure, such as bus stops, railway stations, and similar things, with a place name and a geographical location of the destination in each case.

Furthermore, an output unit 50, which is a display device in the present case, is connected to controller 20. Driving instructions for the vehicle driver, for example in the form of a direction arrow for approaching turns and a display of the distance remaining until the turn, are illustrated on this display device during the actual navigation procedure. However, it is also possible that, in addition or as an alternative to the visual display, output unit 50 includes an acoustic output device, via which acoustic driving instructions are output, such as "turn right in 100 meters" or something similar.

Finally, an input unit 45, having operating elements (not shown), such as pushbuttons, or other input means, such as rotary knobs, for inputting a navigation destination point and for operating other functions of the device, is connected to controller 20. Controller 20 is preferably designed in the form of a program-controlled microprocessor for carrying out the operations and calculations required by a vehicle navigation device in the course of a route calculation in a vehicle navigation device and/or for destination guidance. In particular, the controller carries out the following operations:

reading in a destination place name selected by the vehicle driver using input unit 45, as well as controlling the destination location input, for example by plausibility checking, through comparison with place names contained in memory 60, of a place name or place name element input, assigning location coordinates to the selected destination location on the basis of the map data stored in memory 60, determining the current vehicle location from the position data, or data suitable for calculating the position, supplied by the yaw rate sensor, the odometer, and the GPS receiver, calculating a journey route from the current vehicle location to the destination location selected by the user or in another way on the basis of the map data stored in memory 60, comparing the current vehicle position to the salient points, in particular turns, lying on the calculated route, generating driving instructions for destination guidance of the vehicle driver upon reaching the salient points lying on the route, comparing the current vehicle position to the calculated journey route to determine any possible deviation of the vehicle position from the journey route as a consequence of not following a driving instruction or of an unforeseen turn, and, if necessary, recalculating of the journey route.

In connection with the present invention, controller 20 additionally controls, in particular, the input of a navigation destination and for this purpose includes, in particular, the following functions:

reading in characters input by the user as a part of a destination name, determining a current location, reading out those destinations from memory 60 which lie in a selected radius around the current location and whose assigned destination names begin with the letters input, or reading out all destinations whose assigned destination name begins with the letters input, sorting the destinations read out, preferably in alphabetical order or according to their distance from the current location, outputting the sorted list of the destinations read out, reading in a selection of a destination selected by the user from the list and adopting this destination as the destination for the next route calculation and the next destination guidance procedure.

Figure 2:
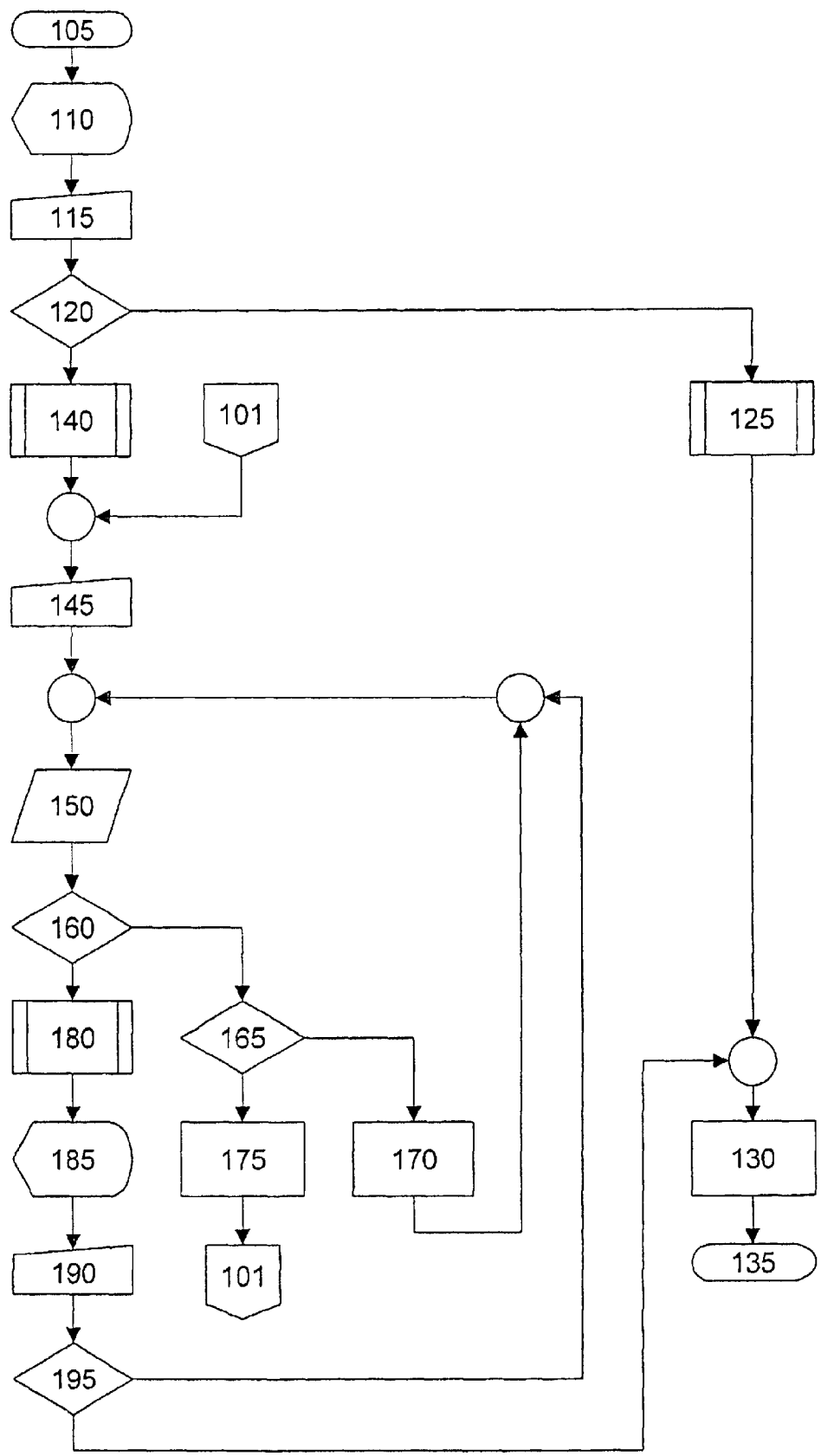
FIG. 2 shows a flowchart of the method according to the present invention.

The method according to the present invention for entering destinations into a navigation device is described in more detail in the following with reference to the flowchart illustrated in FIG. 2.

The sequence begins in step 105 with switching on the vehicle navigation device, for example by switching on the vehicle ignition of the vehicle in which navigation device 10 is operated.

Subsequently, the vehicle driver is asked to make a selection as to whether a destination in the vicinity of the current vehicle location is to be selected, the vicinity normally being defined as a radius of 50 km around the current location, for example, or whether the destination input is to be performed in the usual way (step 110). Furthermore, the vicinity within which the navigation destination is to lie may be selected by the user.

Subsequently, the input mode to be specified by the user is queried (step 115). The user may preferably specify here that the destination is to be input in the usual way, the destination is to lie within a predefined vicinity, for example a radius of 50 km around the current location, the destination is to lie within a radius around the current location to be specified by the user, the scope of the radius being queried.

Furthermore, the type of output of the destinations found for one or more characters of the destination name specified by the user may preferably be specified by the user, namely whether the list of destinations found is to be output in alphabetical order, the list of destinations found is to be output according to the distance of the destinations from the current location, or the list of destinations found is to be output in alphabetical order of the destinations found and, in the case of multiple destinations having destination names or significant elements of the destination name which are identical, such as Neustadt/Weinstraße and Neustadt/Donau, is to be sorted according to the distance of the destinations from the current location, i.e., in the case of an assumed current location at Kaiserslautern, in the sequence 1. Neustadt/Weinstraße, 2. Neustadt/Donau, the place name Neustadt representing the significant element of the destination name in this case.

If a typical destination input is desired, which is established in step 120, this is performed in step 125 in a way known per se and therefore not described in more detail. The destination name input in this way is assigned to a destination location contained in the memory (step 130), thus ending the destination input procedure (step 135).

In contrast, if an input of a destination in the standard vicinity or a user-defined vicinity is desired, which is checked in step 120, then the sequence is continued by determining the current location from the information of sensors 30, 35, and 40 and comparing the location calculated on the basis of the sensor signals with the map information stored in memory 60 using a plausibility check, which is known in the professional literature by the name "map matching," (step 140).

Subsequently, a first letter of the destination name is input by the user (step 145). This letter input is performed by selecting a letter from an alphabet shown on display unit 50, for example by moving a cursor onto the letter to be selected using cursor control buttons and subsequently confirming the highlighted letter, preferably using a confirmation button of input unit 45.

After a letter is input, those destinations
1. which lie within the selected radius or the vicinity around the current location and
2. whose assigned destination names begin with the letter(s) already input (step 150) are read out from memory 60.

The distance of a destination established in the map data of memory 60 from the current location is preferably determined on the basis of the geographical data of the current position and the geographical location of the destination, preferably as an air line distance.

If it is established that a destination and/or destination name which fulfills the criteria described cannot be found in the memory (step 160), and it is also established that the scope of the vicinity has not yet exceeded a maximum value of, for example, 1000 km (step 165), the scope of the vicinity specified in a standard or user-defined way is enlarged (step 170) and destinations
1. which lie in the—now expanded—selected radius or vicinity around the current location and
2. whose assigned destination names begin with the letter(s) already input (step 150) are again sought in memory 60.

In contrast, if it is established in step 165 that, in spite of the maximum scope of the vicinity, a destination fulfilling the criteria specified is not present in memory 60, it is assumed that a destination name beginning with the letter(s) input and an associated destination are not present in memory 60.

The letter(s) input up to this point are therefore not part of a valid destination name. Therefore, the last letter input is erased (step 175) and the operation is continued by inputting a letter or, if more than one letter was already input previously, by inputting a further letter of the destination place name (step 145; via discontinuity 101).

In contrast, if it is determined in step 160 that one or more destinations which lie in the selected or expanded vicinity of the current location and whose destination names begin with the letter(s) input exist in memory 60, then, in the case of multiple destinations, they are sorted, as specified in step 115, either alphabetically, or according to their distance from the current location, or alphabetically as the primary sorting criterion and, in the case of multiple destination names or significant elements of the destination name which are identical, secondarily according to their distance from the current location, the distance values established in step 150 being used as a basis.

Subsequently, the list of destinations, preferably in the form of the destination names assigned to the destinations, is shown on the display unit according to the specified sorting criterion (step 185).

The user now has the possibility of inputting a further letter of the destination name on operating unit 45 in the way described (step 190). If such a further letter input is performed, which is checked in step 195, then a new search is subsequently carried out in step 150 in the map data stored in memory 60 for destinations which lie inside the specified vicinity of the current location and whose destination names begin with the characters input.

Alternatively, the user has the possibility, by selecting an entry using the cursor via the cursor control buttons and confirming a selected destination or destination name, of selecting this destination or destination name from the list of navigation destinations or destination names shown on display unit 50 (step 190). If a destination or destination name has been selected, which is queried in step 195, the selected destination or the destination assigned to the selected destination name(s) is adopted as the navigation destination (step 130) and the destination input sequence is ended (step 135).

What is claimed is:

1. A method for entering a destination into a navigation device, comprising:

inputting at least one character of a destination name;

generating a list of destination names that begin with the at least one inputted character as a function of the at least one inputted character;

incorporating into the list of destination names only those destination names whose assigned destinations lie within a selected radius of a current location defined by a distance from the current location; and expanding the selected radius if none of the incorporated list of destinations lie within the selected radius.

2. The method as recited in claim 1, further comprising:

sorting the list of destination names as a function of the distance of the destinations assigned to the destination names, from the current location.

3. The method as recited in claim 2, further comprising:

sorting as a first priority the list of destination names alphabetically; and sorting those destination names having common significant elements as a function of the distance of the destinations assigned to the destination names, from the current location.

4. The method as recited in claim 1, further comprising:

sorting the list of destination names alphabetically.

5. The method as recited in claim 1, further comprising:

erasing an inputted character if the at least one inputted character is an invalid destination name.

\* \* \* \* \*